US008144159B2

(12) United States Patent
Brunner et al.

(10) Patent No.: US 8,144,159 B2
(45) Date of Patent: Mar. 27, 2012

(54) PARTIAL DISPLAY UPDATES IN A WINDOWING SYSTEM USING A PROGRAMMABLE GRAPHICS PROCESSING UNIT

(75) Inventors: Ralph Brunner, Cupertino, CA (US); John Harper, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/111,089

(22) Filed: May 19, 2011

(65) Prior Publication Data

US 2011/0216079 A1 Sep. 8, 2011

Related U.S. Application Data

(63) Continuation of application No. 11/696,588, filed on Apr. 4, 2007, now Pat. No. 7,969,453, which is a continuation of application No. 10/957,557, filed on Oct. 1, 2004, now Pat. No. 7,652,678, which is a continuation of application No. 10/877,358, filed on Jun. 25, 2004, now abandoned.

(51) Int. Cl.

*G06F 15/16* (2006.01)
*G06F 13/00* (2006.01)
*G09G 5/399* (2006.01)

(52) U.S. Cl. ........ 345/537; 345/502; 345/503; 345/538; 345/539

(58) Field of Classification Search .................. 345/502, 345/503, 538, 539, 537
See application file for complete search history.

(56) References Cited

U.S. PATENT DOCUMENTS

| | | | |
|---|---|---|---|
| 5,388,201 | A | 2/1995 | Hourvitz et al. |
| 5,490,246 | A | 2/1996 | Brotsky et al. |
| 5,651,107 | A | 7/1997 | Frank et al. |
| 5,706,478 | A | 1/1998 | Dye |
| 5,764,229 | A | 6/1998 | Bennett |
| 5,793,376 | A | 8/1998 | Tanaka et al. |
| 5,854,637 | A | 12/1998 | Sturges |
| 5,872,729 | A | 2/1999 | Deolaliker |
| 5,877,741 | A | 3/1999 | Chee et al. |
| 5,877,762 | A | 3/1999 | Young et al. |
| 5,933,148 | A | 8/1999 | Oka et al. |
| 5,949,409 | A | 9/1999 | Tanaka et al. |
| 6,006,231 | A | 12/1999 | Popa |
| 6,026,478 | A | 2/2000 | Dowling |

(Continued)

FOREIGN PATENT DOCUMENTS

EP 0548586 6/1993

(Continued)

OTHER PUBLICATIONS

European Search Report received in corresponding application No. EP 06 02 6984 dated May 8, 2007.

(Continued)

*Primary Examiner* — Daniel Washburn
(74) *Attorney, Agent, or Firm* — Wong, Cabello, Lutsch, Rutherford & Brucculeri LLP

(57) ABSTRACT

Techniques to generate partial display updates in a buffered window system in which arbitrary visual effects are permitted to any one or more windows (e.g., application-specific window buffers) are described. Once a display output region is identified for updating, the buffered window system is interrogated to determine which regions within each window, if any, may effect the identified output region. Such determination considers the consequences any filters associated with a window impose on the region needed to make the output update.

16 Claims, 8 Drawing Sheets

U.S. PATENT DOCUMENTS

| | | | | |
|---|---|---|---|---|
| 6,031,937 | A | 2/2000 | Graffagnino | |
| 6,044,408 | A | 3/2000 | Engstrom et al. | |
| 6,075,543 | A | 6/2000 | Akeley | |
| 6,166,748 | A | 12/2000 | Van Hook et al. | |
| 6,211,890 | B1 | 4/2001 | Ohba | |
| 6,215,495 | B1 | 4/2001 | Grantham et al. | |
| 6,246,418 | B1 | 6/2001 | Oka | |
| 6,266,053 | B1 | 7/2001 | French et al. | |
| 6,272,558 | B1 | 8/2001 | Hui et al. | |
| 6,321,314 | B1 | 11/2001 | Van Dyke | |
| 6,362,822 | B1 | 3/2002 | Randel | |
| 6,369,823 | B2 | 4/2002 | Ohba | |
| 6,369,830 | B1 | 4/2002 | Brunner et al. | |
| 6,411,301 | B1 | 6/2002 | Parikh et al. | |
| 6,421,058 | B2 | 7/2002 | Parikh et al. | |
| 6,421,060 | B1 | 7/2002 | Luken | |
| 6,424,348 | B2 | 7/2002 | Parikh | |
| 6,452,600 | B1 | 9/2002 | Parikh et al. | |
| 6,456,290 | B2 | 9/2002 | Parikh et al. | |
| 6,457,034 | B1 | 9/2002 | Morein | |
| 6,466,218 | B2 | 10/2002 | Parikh et al. | |
| 6,489,963 | B2 | 12/2002 | Parikh et al. | |
| 6,525,725 | B1 | 2/2003 | Deering | |
| 6,526,174 | B1 | 2/2003 | Graffagnino | |
| 6,542,160 | B1 | 4/2003 | Abgrall | |
| 6,571,328 | B2 | 5/2003 | Liao et al. | |
| 6,577,317 | B1 | 6/2003 | Duluk, Jr. et al. | |
| 6,580,430 | B1 | 6/2003 | Hollis et al. | |
| 6,600,840 | B1 | 7/2003 | McCrossin et al. | |
| 6,609,977 | B1 | 8/2003 | Shimizu et al. | |
| 6,614,444 | B1 | 9/2003 | Duluk, Jr. et al. | |
| 6,618,048 | B1 | 9/2003 | Leather | |
| 6,636,214 | B1 | 10/2003 | Leather et al. | |
| 6,639,595 | B1 | 10/2003 | Drebin et al. | |
| 6,664,958 | B1 | 12/2003 | Leather et al. | |
| 6,664,962 | B1 | 12/2003 | Komsthoeft et al. | |
| 6,674,438 | B1 | 1/2004 | Yamamoto et al. | |
| 6,694,486 | B2 | 2/2004 | Frank et al. | |
| 6,697,074 | B2 | 2/2004 | Parikh et al. | |
| 6,707,462 | B1 | 3/2004 | Peercy et al. | |
| 6,715,053 | B1 | 3/2004 | Grigor | |
| 6,717,586 | B2 | 4/2004 | Fujiki | |
| 6,717,599 | B1 | 4/2004 | Olano | |
| 6,734,864 | B2 | 5/2004 | Abgrall | |
| 6,757,438 | B2 | 6/2004 | Graffagnino | |
| 6,760,888 | B2 | 7/2004 | Killian et al. | |
| 6,784,897 | B2 | 8/2004 | I | |
| 6,801,202 | B2 | 10/2004 | Nelson et al. | |
| 6,831,635 | B2 | 12/2004 | Boyd et al. | |
| 6,867,779 | B1 | 3/2005 | Doyle | |
| 6,906,720 | B2 | 6/2005 | Emberling | |
| 6,911,984 | B2 | 6/2005 | Sabella | |
| 6,919,906 | B2 | 7/2005 | Hoppe et al. | |
| 6,977,661 | B1 | 12/2005 | Stokes | |
| 6,995,765 | B2 | 2/2006 | Boudier | |
| 7,002,591 | B1 | 2/2006 | Leather et al. | |
| 7,038,690 | B2 * | 5/2006 | Wilt et al. | 345/537 |
| 7,042,467 | B1 * | 5/2006 | Hamburg | 345/629 |
| 7,053,904 | B1 * | 5/2006 | Kirk et al. | 345/531 |
| 7,106,275 | B2 | 9/2006 | Brunner et al. | |
| 7,142,709 | B2 | 11/2006 | Girard | |
| 7,162,716 | B2 | 1/2007 | Glanville et al. | |
| 7,200,807 | B2 | 4/2007 | Wu et al. | |
| 7,274,370 | B2 | 9/2007 | Paquette | |
| 7,382,378 | B2 | 6/2008 | Levene et al. | |
| 7,554,538 | B2 * | 6/2009 | Wexler et al. | 345/418 |
| 7,817,163 | B2 | 10/2010 | Hanggie et al. | |
| 7,839,419 | B2 | 11/2010 | Hanggie | |
| 7,928,997 | B2 * | 4/2011 | Bastos et al. | 345/634 |
| 2002/0033844 | A1 | 3/2002 | Levy | |
| 2002/0033880 | A1 | 3/2002 | Sue et al. | |
| 2002/0080143 | A1 | 6/2002 | Morgan et al. | |
| 2002/0174181 | A1 | 11/2002 | Wei | |
| 2004/0169650 | A1 * | 9/2004 | Bastos et al. | 345/426 |
| 2004/0223003 | A1 | 11/2004 | Heirich | |
| 2005/0088452 | A1 * | 4/2005 | Hanggie et al. | 345/581 |
| 2005/0225670 | A1 * | 10/2005 | Wexler et al. | 348/441 |

FOREIGN PATENT DOCUMENTS

| | | |
|---|---|---|
| EP | 0694879 | 1/1996 |
| EP | 1383080 | 1/2004 |
| EP | 0972273 | 3/2004 |
| WO | 1998045815 | 10/1998 |
| WO | 2002009039 | 1/2002 |
| WO | 2004027707 | 4/2004 |

OTHER PUBLICATIONS

European Search Report received in corresponding application No. EP 06 02 7057 dated May 7, 2007.

European Search Report received in corresponding application No. EP 06 02 7056 dated May 9, 2007.

International Search Report dated Mar. 8, 2006 (PCT/US05/019108).

Written Opinion of the International Searching Authority dated Aug. 8, 2005 received in corresponding PCT application No. PCT/US05/008805.

Written Opinion of the International Searching Authority received in corresponding application No. PCT/ US2005/008804 dated Jul. 27, 2005.

International Search Report received in corresponding application No. PCT/US05/008804 dated Jul. 27, 2005.

International Search Report received in corresponding application No. PCT/US05/008805 dated Aug. 8, 2005.

Haeberli et al.; "The Accumulation Buffer: Hardware Support for High-Quality Rendering;" Computer Graphics, New York, NY; vol. 24, Aug. 1, 1990; pp. 309-318.

nVIDIA; "Cg—Teaching Cg;" Power Point Presentation , Author and date unkown.

Shantzis; "A Model for Efficient and Flexible Image Computing;" Computer Graphics Proceedings, Annual Conference Series; 1994; pp. 147-154.

Akeley et al; "Real-Time Graphics Architecture;" located at http://www.graphics.stanford.edu/courses/cs448a-01-fall; The OpenGL® Graphics System—CS448 Lecture 15, Fall 2001; 99. 1-20.

Gelder, et al.; "Direct Volume Rendering with Shading via Three-Dimensional Textures;" Computer Science Dept.; University of California, Santa Cruz, CA 95064.

Elliot; "Programming Graphics Processors Functionality".

Segal et al; "The OpenGL ® Graphics System: A Specification (Version 1.5)" Copyright © 1992-2003 Silicon Graphics, Inc.; Oct. 30, 2003.

"GNU C Compiler Internal;" Internet article located at: http://en.wikibooks.org/wiki/GNU_C_Compiler_Internals/GNU_C_Compiler_Architecture_3_4.

Novillo; "From Source to Binary: The Inner Workings of GCC;" Internet article located at: http://www.redhat.com/magazine/002dec04/features/gcc/; Red Hat Magazine, Issue 2, Dec. 2004.

Berlin et al.; "High-Level Loop Optimizations for GCC;" Internet article located at: http://gcc-ca.internet.bs/summit/2004/High%20Level%20Loop%20Optimizations.pdf; GCC Developers' Summit, Jun. 2-4, 2004, Ottawa, Canada.

Novillo; "OpenMP and automatic parallelization in GCC;" Internet article located at: http://people.redhat.com/dnovillo/Papers/gcc2006.pdf; GCC Developers' Summit, Jun. 28-30, 2006, Ottawa, Canada.

Bothner; "Gcc Compile Server;" Internet article located at: http://gcc-ca.internet.bs/summit/2003/GCC%20Compile%20Server.pdf GCC Developers' Summit, May 25-27, 2003, Ottawa, Canada.

Office Action received in corresponding case U.S. Appl. No. 10/877,358 dated May 24, 2005.

Response to Office Action filed in corresponding case U.S. Appl. No. 10/877,358 dated Aug. 4, 2005.

Office Action received in corresponding case U.S. Appl. No. 10/877,358 dated Apr. 12, 2006.

Response to Office Action filed in corresponding case U.S. Appl. No. 10/877,358 dated May 8, 2006.

Office Action received in corresponding case U.S. Appl. No. 10/877,358 dated Jul. 26, 2006.

Response to Office Action filed in corresponding case U.S. Appl. No. 10/877,358 dated Oct. 25, 2006.

Notice of Non-Compliant Response received in corresponding case U.S. Appl. No. 10/877,358 dated Nov. 1, 2006.
Response to Non-Compliant Response filed in corresponding case U.S. Appl. No. 10/877,358 dated Nov. 27, 2006.
Office Action received in corresponding case U.S. Appl. No. 10/877,358 dated Feb. 16, 2007.
Response to Office Action filed in corresponding case U.S. Appl. No. 10/877,358 dated May 10, 2007.
Office Action received in corresponding case U.S. Appl. No. 10/877,358 dated Jul. 24, 2007.
Response to Office Action filed in corresponding case U.S. Appl. No. 10/877,358 dated Oct. 24, 2007.
Final Office Action received in corresponding case U.S. Appl. No. 10/877,358 dated Jan. 2, 2008.
Notice of Appeal filed in corresponding case U.S. Appl. No. 10/877,358 dated Apr. 2, 2008.
Appeal Brief filed in corresponding case U.S. Appl. No. 10/877,358 dated Jun. 2, 2008.
Examiner's Answer received in corresponding case U.S. Appl. No. 10/877,358 dated Aug. 21, 2008.
Decision on Appeal received in corresponding case U.S. Appl. No. 10/877,358 dated Feb. 14, 2011.

* cited by examiner

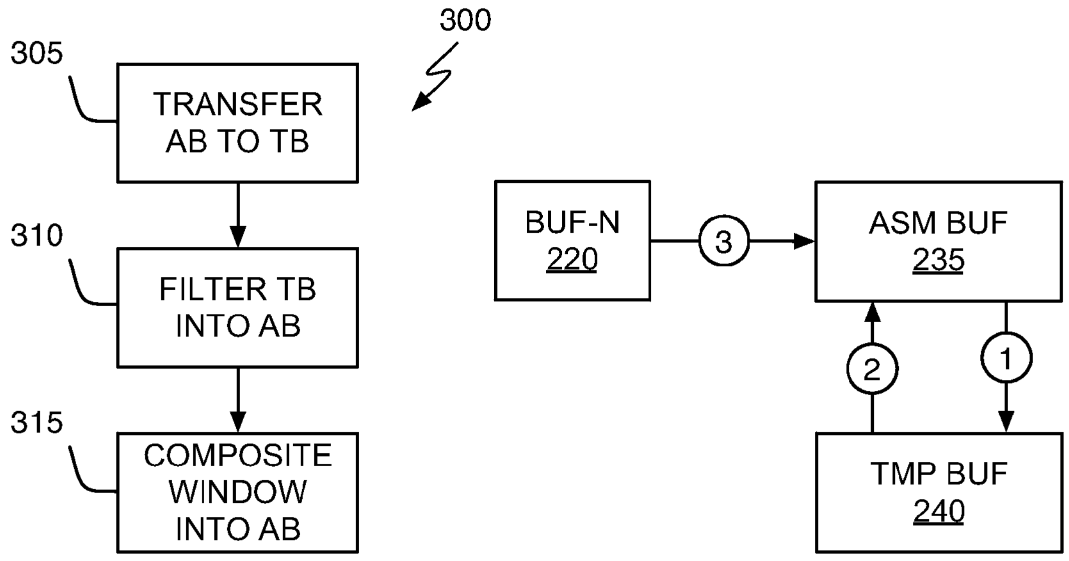
FIG. 3A
FIG. 3B
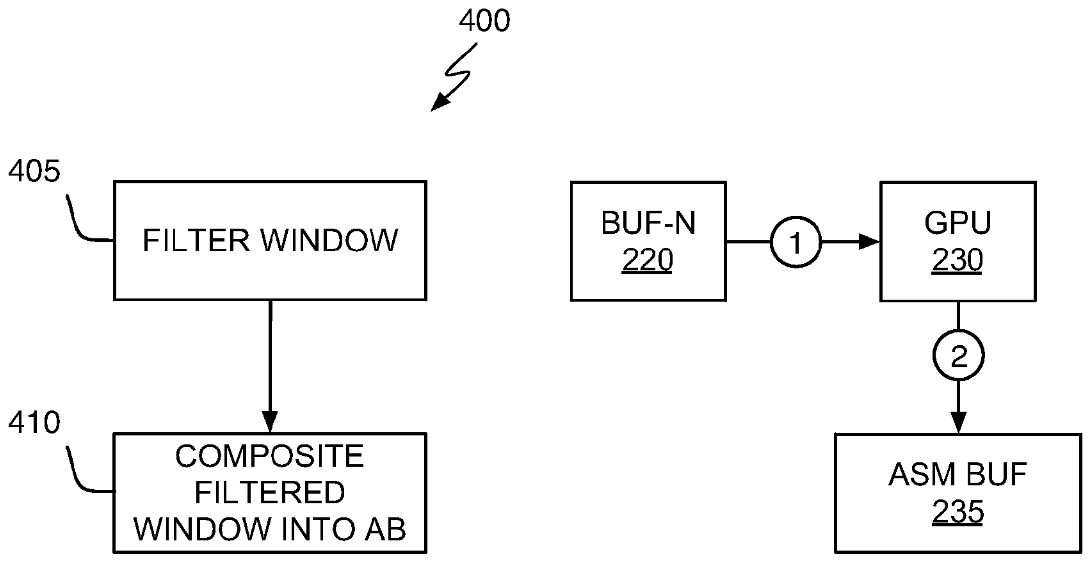
FIG. 4A
FIG. 4B

PARTIAL DISPLAY UPDATES IN A WINDOWING SYSTEM USING A PROGRAMMABLE GRAPHICS PROCESSING UNIT

This is a continuation application which claims priority to U.S. patent application Ser. No. 11/696,588 entitled "Partial Display Updates in a Windowing System Using a Programmable Graphics Processing Unit," filed Apr. 4, 2007, which claims priority to U.S. patent application Ser. No. 10/957,557 filed Oct. 1, 2004 (bearing the same title), which claims priority to U.S. patent application Ser. No. 10/877,358, entitled "Display-Wide Visual Effects for a Windowing System using a Programmable Graphics Processing Unit," filed 25 Jun. 2004, each of which is hereby incorporated by reference in their entirety.

BACKGROUND

The invention relates generally to computer display technology and, more particularly, to the application of visual effects using a programmable graphics processing unit. The subject matter of the invention is generally related to the following jointly owned and co-pending patent applications: "System for Reducing the Number of Programs Necessary to Render an Image," by John Harper, Ser. No. 10/826,773; "System for Optimizing Graphics Operations" by John Harper, Ralph Brunner, Peter Graffagnino, and Mark Zimmer, Ser. No. 10/825,694; "System for Emulating Graphics Operations," by John Harper, Ser. No. 10/826,744; and "High-Level Program Interface for Graphics Operations," by John Harper, Ralph Brunner, Peter Graffagnino, and Mark Zimmer, Ser. No. 10/826,762, each incorporated herein by reference in its entirety.

Referring to FIG. 1, in prior art buffered window computer system 100, each application (e.g., applications 105 and 110) has associated with it one or more window buffers or backing stores (e.g., buffers 115 and 120—only one for each application is shown for convenience). Backing store's represent each application's visual display. Applications produce a visual effect (e.g., blurring or distortion) through manipulation of their associated backing store. At the operating system ("OS") level, compositor 125 combines each application's backing store (in a manner that maintains their visual order) into a single "image" stored in assembly buffer 130. Data stored in assembly buffer 130 is transferred to frame buffer 135 which is then used to drive display unit 140. As indicated in FIG. 1, compositor 125 (an OS-level application) is implemented via instructions executed by computer system central processing unit ("CPU") 145.

Because of the limited power of CPU 145, it has not been possible to provide more than rudimentary visual effects (e.g., translucency) at the system or display level. That is, while each application may effect substantially any desired visual effect or filter to their individual window buffer or backing store, it has not been possible to provide OS designers the ability to generate arbitrary visual effects at the screen or display level (e.g., by manipulation of assembly buffer 130 and/or frame buffer 135) without consuming virtually all of the system CPU's capability—which can lead to other problems such as poor user response and the like.

Thus, it would be beneficial to provide a mechanism by which a user (typically an OS-level programmer or designer) can systematically introduce arbitrary visual effects to windows as they are composited or to the final composited image prior to its display.

SUMMARY

Methods, devices and systems in accordance with the invention provide a means for performing partial display updates in a windowing system that permits layer-specific filtering. One method in accordance with the invention includes: identifying an output region associated with a top-most display layer (e.g., an application-specific window buffer), wherein the output region has an associated output size and location; determining an input region for each of one or more filters, wherein each of the one or more filters is associated with a display layer and has an associated input size and location (substantially any known visual effect filter may be accommodated); establishing a buffer (e.g., an assembly buffer) having a size and location that corresponds to the union of the output region's location and each of the one or more input regions' locations; and compositing that portion of each display layer that overlaps the buffer's location into the established buffer. In one embodiment, that portion of the buffer corresponding to the identified output region is transferred to a frame buffer where it is used to update a user's display device. In another embodiment, the acts of identifying, determining and establishing are performed by one or more general purpose central processing units while the act of compositing is performed by one or more special purpose graphical processing units in a linear fashion (beginning with the bottom-most display layer and proceeding to the top-most display layer).

BRIEF DESCRIPTION OF THE DRAWINGS

FIGS. 3A and 3B show a below-effect in accordance with one embodiment of the invention.

FIGS. 4A and 4B show an on-effect in accordance with one embodiment of the invention.

DETAILED DESCRIPTION

Methods and devices to generate partial display updates in a buffered window system in which arbitrary visual effects are permitted to any one or more windows are described. Once a display output region is identified for updating, the buffered window system is interrogated to determine which regions within each window, if any, may effect the identified output region. Such determination considers the consequences any filters associated with a window impose on the region needed to make the output update. The following embodiments of the invention, described in terms of the Mac OS X window server and compositing application, are illustrative only and are not to be considered limiting in any respect. (The Mac OS X operating system is developed, distributed and supported by Apple Computer, Inc. of Cupertino, Calif.)

Figure 1:
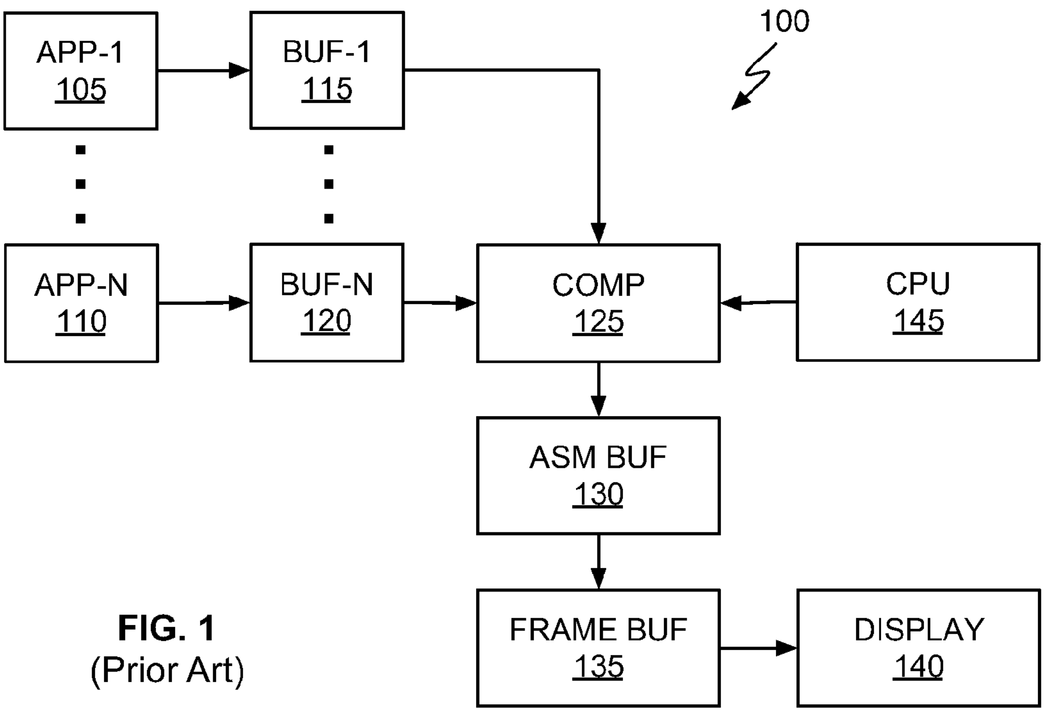
FIG. 1 (Prior Art)
FIG. 1 shows a prior art buffered window computer system.
Figure 2:
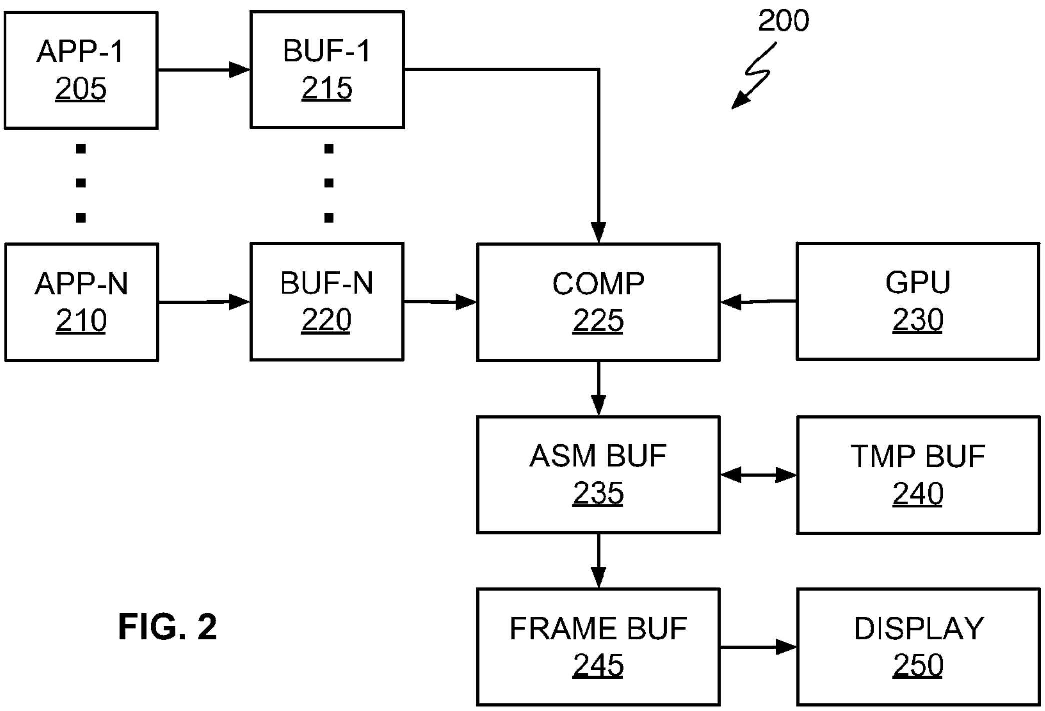
FIG. 2 shows a buffered window computer system in accordance with one embodiment of the invention.

Referring to FIG. 2, buffered window computer system 200 in accordance with one embodiment of the invention includes a plurality of applications (e.g., applications 205 and 210), each of which is associated with one or more backing stores, only one of which is shown for clarity and convenience (e.g., buffers 215 and 220). Compositor 225 (one component in an OS-level "window server" application) uses fragment programs executing on programmable graphics processing unit ("GPU") 230 to combine, or composite, each application's backing store into a single "image" stored in assembly buffer 235 in conjunction with, possibly, temporary buffer 240. Data stored in assembly buffer 235 is transferred to frame buffer 245 which is then used to drive display unit 250. In accordance with one embodiment, compositer 225/GPU 230 may also manipulate a data stream as it is transferred into frame buffer 245 to produce a desired visual effect on display 250.

As used herein, a "fragment program" is a collection of program statements designed to execute on a programmable GPU. Typically, fragment programs specify how to compute a single output pixel—many such fragments being run in parallel on the GPU to generate the final output image. Because many pixels are processed in parallel, GPUs can provide dramatically improved image processing capability (e.g., speed) over methods that rely only on a computer system's CPU (which is also responsible for performing other system and application duties).

Techniques in accordance with the invention provide four (4) types of visual effects at the system or display level. In the first, hereinafter referred to as "before-effects," visual effects are applied to a buffered window system's assembly buffer prior to compositing a target window. In the second, hereinafter referred to as "on-effects," visual effects are applied to a target window as it is being composited into the system's assembly buffer or a filter is used that operates on two inputs at once to generate a final image—one input being the target window, the other being the contents of the assembly buffer. In the third, hereinafter referred to as "above-effects," visual effects are applied to a system's assembly buffer after compositing a target window. And in the fourth, hereinafter referred to as "full-screen effects," visual effects are applied to the system's assembly buffer as it is transmitted to the system's frame-buffer for display.

Referring to FIGS. 3A and 3B, below-effect 300 in accordance with one embodiment of the invention is illustrated. In below-effect 300, the windows beneath (i.e., windows already composited and stored in assembly buffer 235) a target window (e.g., contained in backing store 220) are filtered before the target window (e.g., contained in backing store 220) is composited. As shown, the contents of assembly buffer 235 are first transferred to temporary buffer 240 by GPU 230 (block 305 in FIG. 3A and ← in FIG. 3B). GPU 230 then filters the contents of temporary buffer 240 into assembly buffer 235 to apply the desired visual effect (block 310 in FIG. 3A and ↑ in FIG. 3B). Finally, the target window is composited into (i.e., on top of the contents of) assembly buffer 235 by GPU 230 (block 315 and → in FIG. 3B). It will be noted that because the target window is composited after the visual effect is applied, below-effect 300 does not alter or impact the target window. Visual effects appropriate for a below-effect in accordance with the invention include, but are not limited to, drop shadow, blur and glass distortion effects. It will be known by those of ordinary skill that a filter need not be applied to the entire contents of the assembly buffer or target window. That is, only a portion of the assembly buffer and/or target window need be filtered. In such cases, it is known to use the bounding rectangle or the alpha channel of the target window to determine the region that is to be filtered.

Figure 5A:
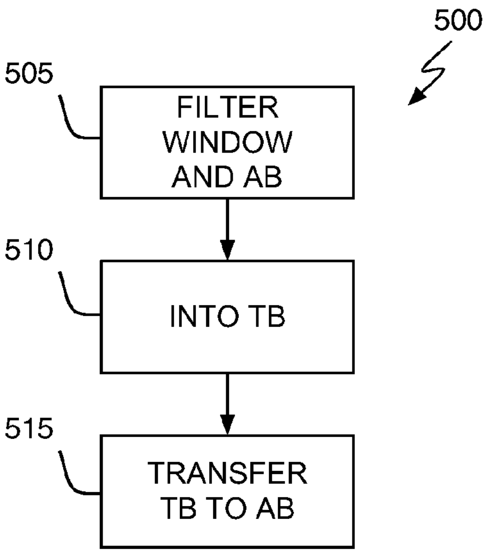
FIGS. 5A and 5B show an on-effect in accordance with another embodiment of the invention.
Figure 5B:
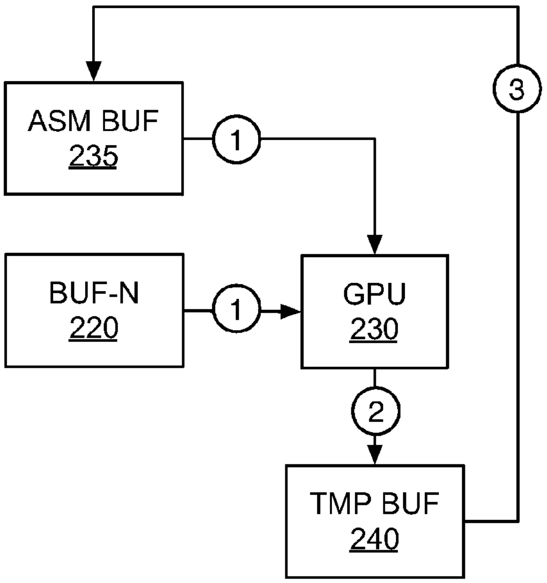

Referring to FIGS. 4A and 4B, on-effect 400 in accordance with one embodiment of the invention is illustrated. In on-effect 400, a target window (e.g., contained in backing store 220) is filtered as it is being composited into a system's assembly buffer. As shown, the contents of window buffer 220 are filtered by GPU 230 (block 405 in FIG. 4A and ← in FIG. 4B) and then composited into assembly buffer 235 by GPU 230 (block 410 in FIG. 4A and ↑ in FIG. 4B). Referring to FIGS. 5A and 5B, on-effect 500 in accordance with another embodiment of the invention is illustrated. In on-effect 500, a target window (e.g., contained in backing store 220) and assembly buffer 235 (block 505 in FIG. 5A and ← in FIG. 5B) are filtered into temporary buffer 240 (block 510 in FIG. 5A and ↑ in FIG. 5B). The resulting image is transferred back into assembly buffer 235 (block 515 in FIG. 5A and → in FIG. 5B). Visual effects appropriate for an on-effect in accordance with the invention include, but are not limited to, window distortions and color correction effects such as grey-scale and sepia tone effects.

Figure 6A:
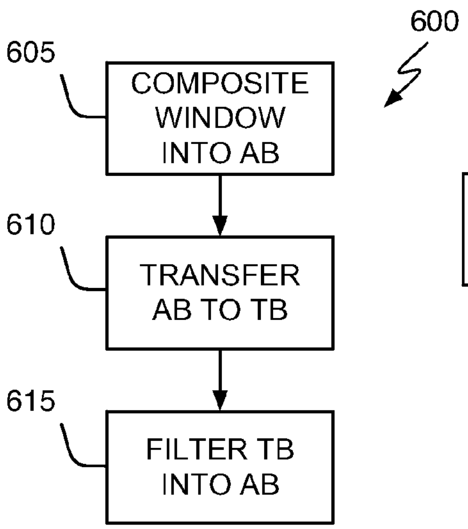
FIGS. 6A and 6B show an above-effect in accordance with one embodiment of the invention.
Figure 6B:
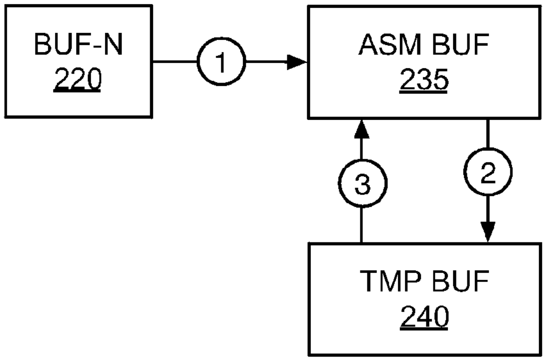

Referring to FIGS. 6A and 6B, above-effect 600 in accordance with one embodiment of the invention is illustrated. In above-effect 600, the target window (e.g., contained in backing store 220) is composited into the system's assembly buffer prior to the visual effect being applied. Accordingly, unlike below-effect 300, the target window may be affected by the visual effect. As shown, the target window is first composited into assembly buffer 235 by GPU 230 (block 605 in FIG. 6A and ← in FIG. 6B), after which the result is transferred to temporary buffer 240 by GPU 230 (block 610 in FIG. 6A and ↑ in FIG. 6B). Finally, GPU 230 filters the contents of temporary buffer 240 into assembly buffer 235 to apply the desired visual effect (block 615 in FIG. 6A and → in FIG. 6B). Visual effects appropriate for an on-effect in accordance with the invention include, but are not limited to, glow effects.

Figure 7A:
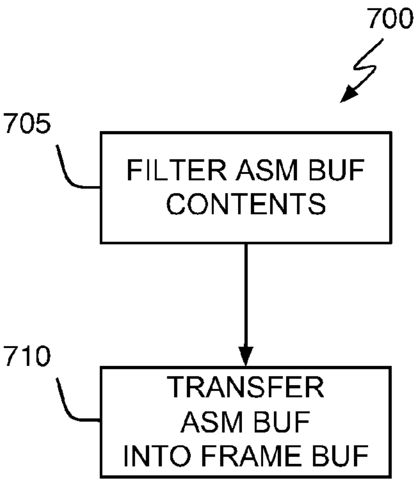
FIGS. 7A and 7B show a full-screen effect in accordance with one embodiment of the invention.
Figure 7B:
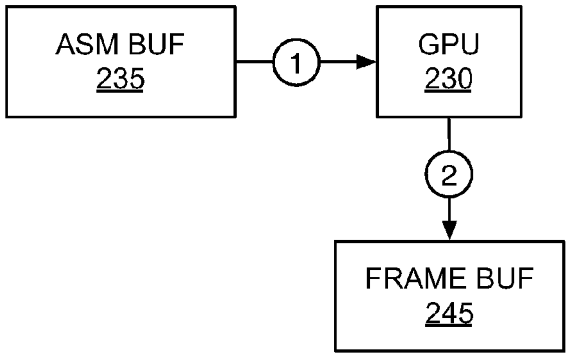

Referring to FIGS. 7A and 7B, full-screen effect 700 in accordance with one embodiment of the invention is illustrated. In full-screen effect 700, the assembly buffer is filtered as it is transferred to the system's frame buffer. As shown, the contents of assembly buffer 235 are filtered by GPU 230 (block 705 in FIG. 7A and ← in FIG. 7B) as the contents of assembly buffer 235 are transferred to frame buffer 245 (block 710 in FIG. 7A and ↑ in FIG. 7B). Because, in accordance with the invention, programmable GPU 230 is used to apply the visual effect, virtually any visual effect may be used. Thus, while prior art systems are incapable of implementing sophisticated effects such as distortion, tile, gradient and blur effects, these are possible using the inventive technique. In particular, high-benefit visual effects for a full-screen effect in accordance with the invention include, but are not limited to, color correction and brightness effects. For example, it is known that liquid crystal displays ("LCDs") have a non-uniform brightness characteristic across their surface. A full-screen effect in accordance with the invention could be used to remove this visual defect to provide a uniform brightness across the display's entire surface.

It will be recognized that, as a practical matter, full-screen visual effects must conform to the system's frame buffer scan rate. That is, suitable visual effects in accordance with 700 include those effects in which GPU 230 generates filter output at a rate faster than (or at least as fast as) data is removed from frame buffer 245. If GPU output is generated slower than data is withdrawn from frame buffer 245, potential display problems can arise. Accordingly, full-screen effects are generally limited to those effects that can be applied at a rate faster than the frame buffer's output scan rate.

Figure 8:
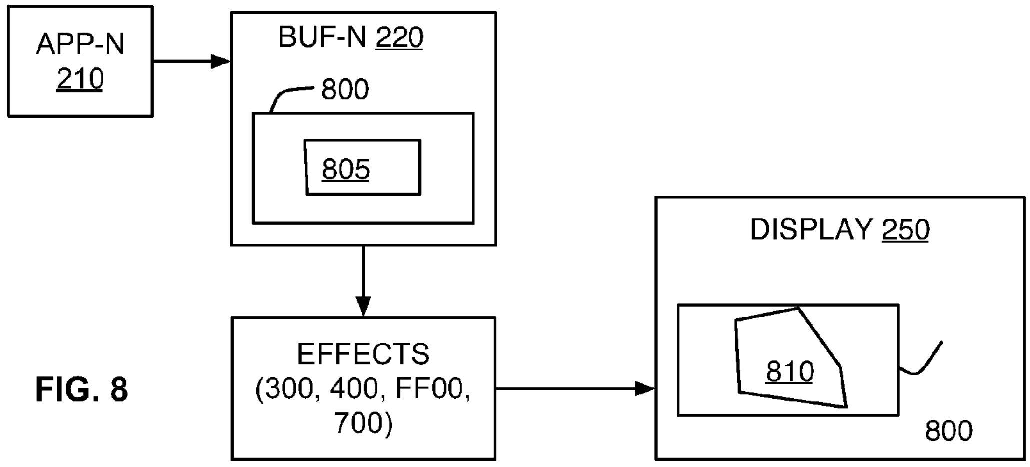
FIG. 8 shows, in block diagram form, a display whose visual presentation has been modified in accordance with the invention.

Event routing in a system employing visual effects in accordance with the invention must be modified to account for post-application effects. Referring to FIG. 8, for example, application 210 may write into window buffer 220 such that window 800 includes button 805 at a particular location. After being modified in accordance with one or more of effects 300, 400, 600 and 700, display 250 may appear with button 805 modified to display as 810. Accordingly, if a user (the person viewing display 250) clicks on button 810, the system (i.e., the operating system) must be able to map the location of the mouse click into a location known by application 210 as corresponding to button 805 so that the application knows what action to take.

Figure 9:
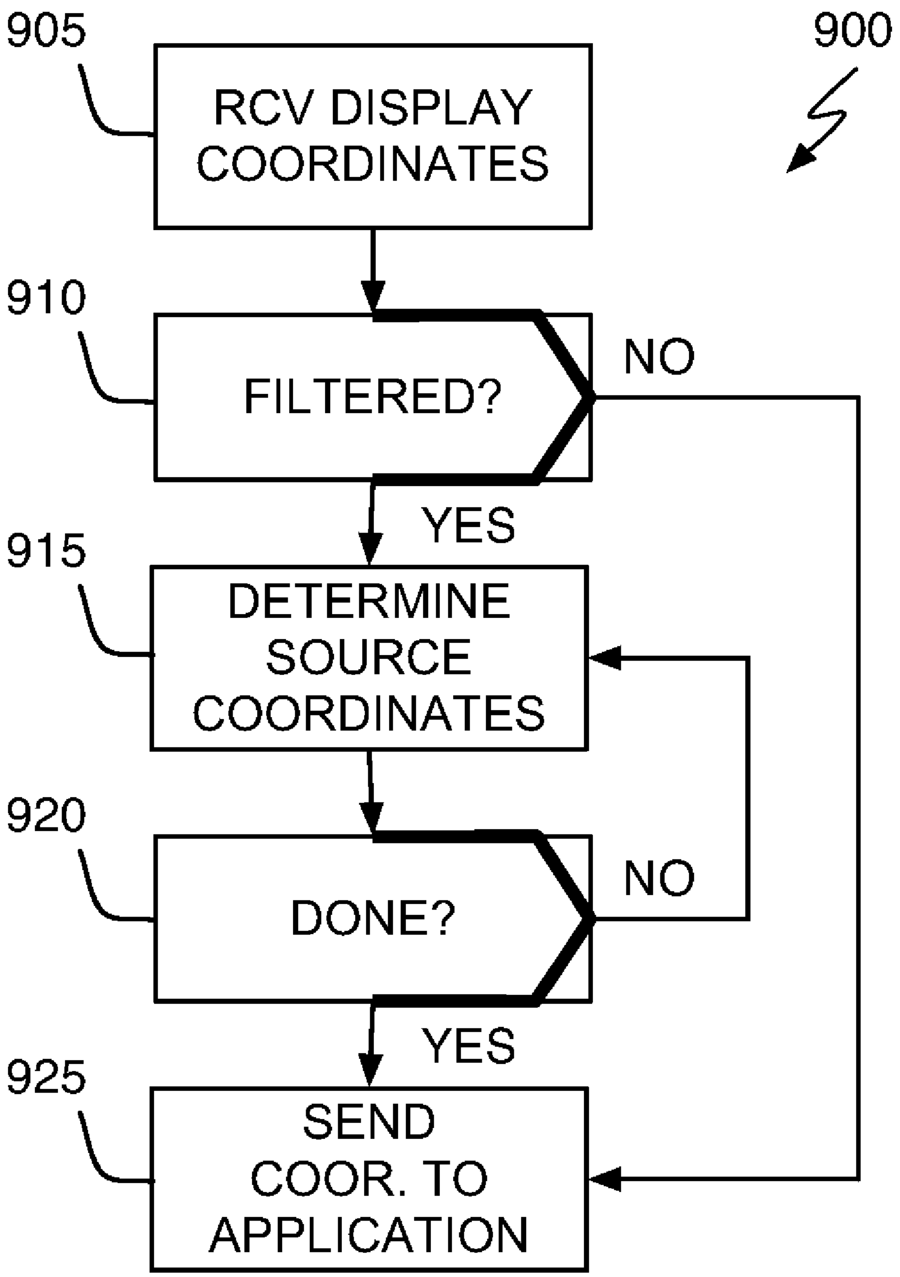
FIG. 9 shows, in flowchart form, an event processing technique in accordance with one embodiment of the invention.

It will be recognized by those of ordinary skill in the art that filters (i.e., fragment programs implementing a desired visual effect) operate by calculating a destination pixel location (i.e., $x_d$, $y_d$) based on one or more source pixels. Accordingly, the filters used to generate the effects may also be used to determine the source location (coordinates). Referring to FIG. 9, event routing 900 in accordance with one embodiment of the invention begins when an event is detected (block 905). As used herein, an event may be described in terms of a "click" coordinate, e.g., ($x_{click}$, $y_{click}$). Initially, a check is made to determine if the clicked location comports with a filtered region of the display. If the clicked location ($x_{click}$, $y_{click}$) has not been subject to an effect (the "No" prong of block 910), the coordinate is simply passed to the appropriate application (block 925). If the clicked location ($x_{click}$, $y_{click}$) has been altered in accordance with the invention (the "Yes" prong of block 910), the last applied filter is used to determine a first tentative source coordinate (block 915). If the clicked location has not been subject to additional effects in accordance with the invention (the "Yes" prong of block 920), the first tentative calculated source coordinate is passed to the appropriate application (block 925). If the clicked location has been subject to additional effects in accordance with the invention (the "No" prong of block 920), the next most recently applied filter is used to calculate a second tentative source coordinate. Processing loop 915-920 is repeated for each filter applied to clicked location ($x_{click}$, $y_{click}$).

In addition to generating full-screen displays utilizing below, on and above filtering techniques as described herein, it is possible to generate partial screen updates. For example, if only a portion of a display has changed only that portion need be reconstituted in the display's frame buffer.

Figure 10:
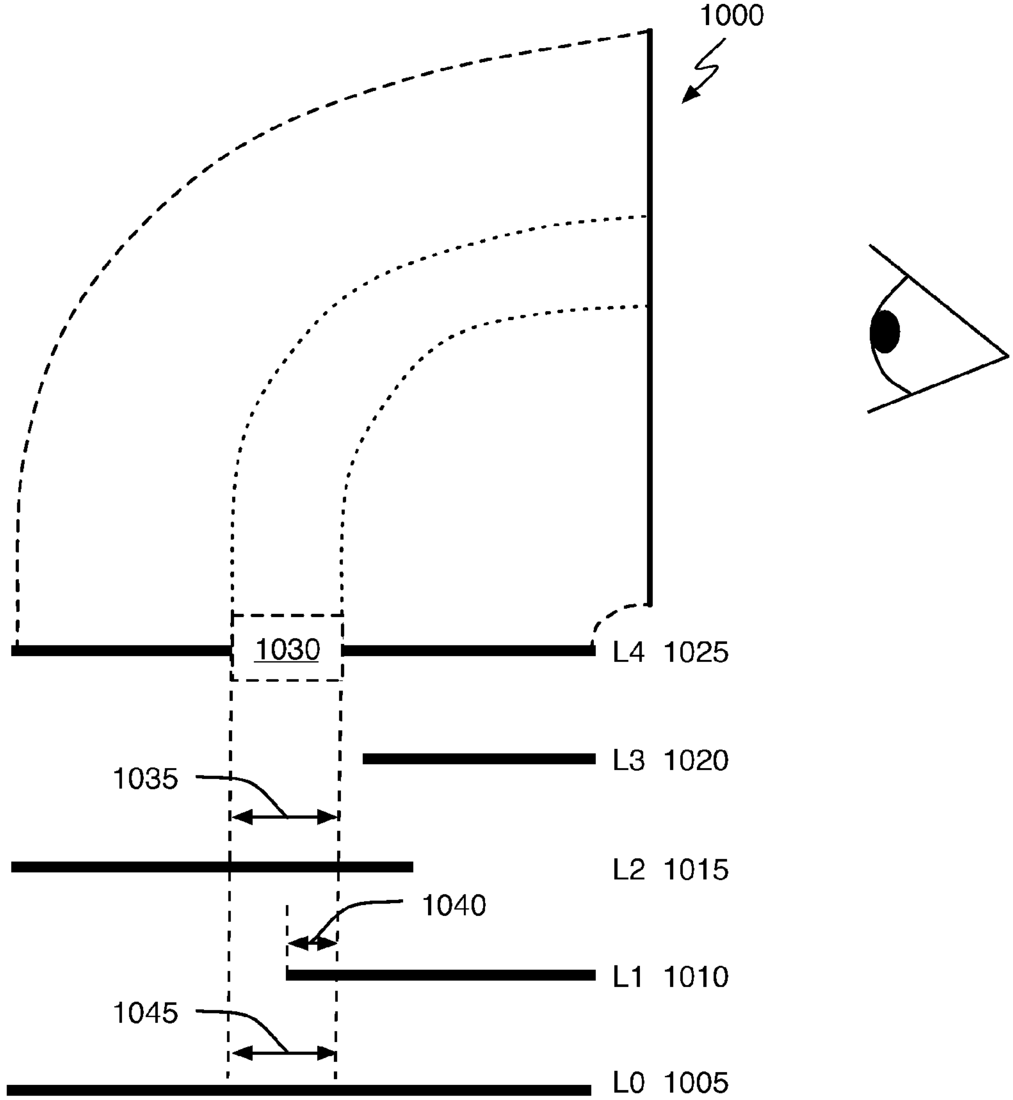
FIG. 10 (Prior Art)
FIG. 10 shows a system in which a partial display update in accordance with the prior art is performed.

Referring to FIG. 10, consider the case where user's view 1000 is the result of five (5) layers: background layer L0 1005, layer L1 1010, layer L2 1015, layer L3 1020 and top-most layer L4 1025. In the prior art, when region 1030 was identified by the windowing subsystem as needed to be updated (e.g., because a new character or small graphic is to be shown to the user), an assembly buffer was created having a size large enough to hold the data associated with region 1030. Once created, each layer overlapping region 1030 (e.g., regions 1035, 1040 and 1045) was composited into the assembly buffer—beginning at background layer L0 1005 (region 1045) up to top-most layer L4 1025 (region 1030). The resulting assembly buffer's contents were then transferred into the display's frame buffer at a location corresponding to region 1030.

When layer-specific filters are used in accordance with the invention, the prior art approach of FIG. 10 does not work. For example, a specified top-layer region comprising (a×b) pixels may, because of that layer's associated filter, require more (e.g., due to a blurring type filter) or fewer (e.g., due to a magnification type filter) pixels from the layer below it. Thus, the region identified in the top-most layer by the windowing subsystem as needing to be updated may not correspond to the required assembly buffer size. Accordingly, the effect each layer's filter has on the ability to compute the ultimate output region must be considered to determine what size of assembly buffer to create. Once created, each layer overlapping the identified assembly buffer's extent (size and location) may be composited into the assembly buffer as described above with respect to FIG. 10 with the addition of applying that layer's filter—e.g., a below, on or above filter as previously described.

Figure 11:
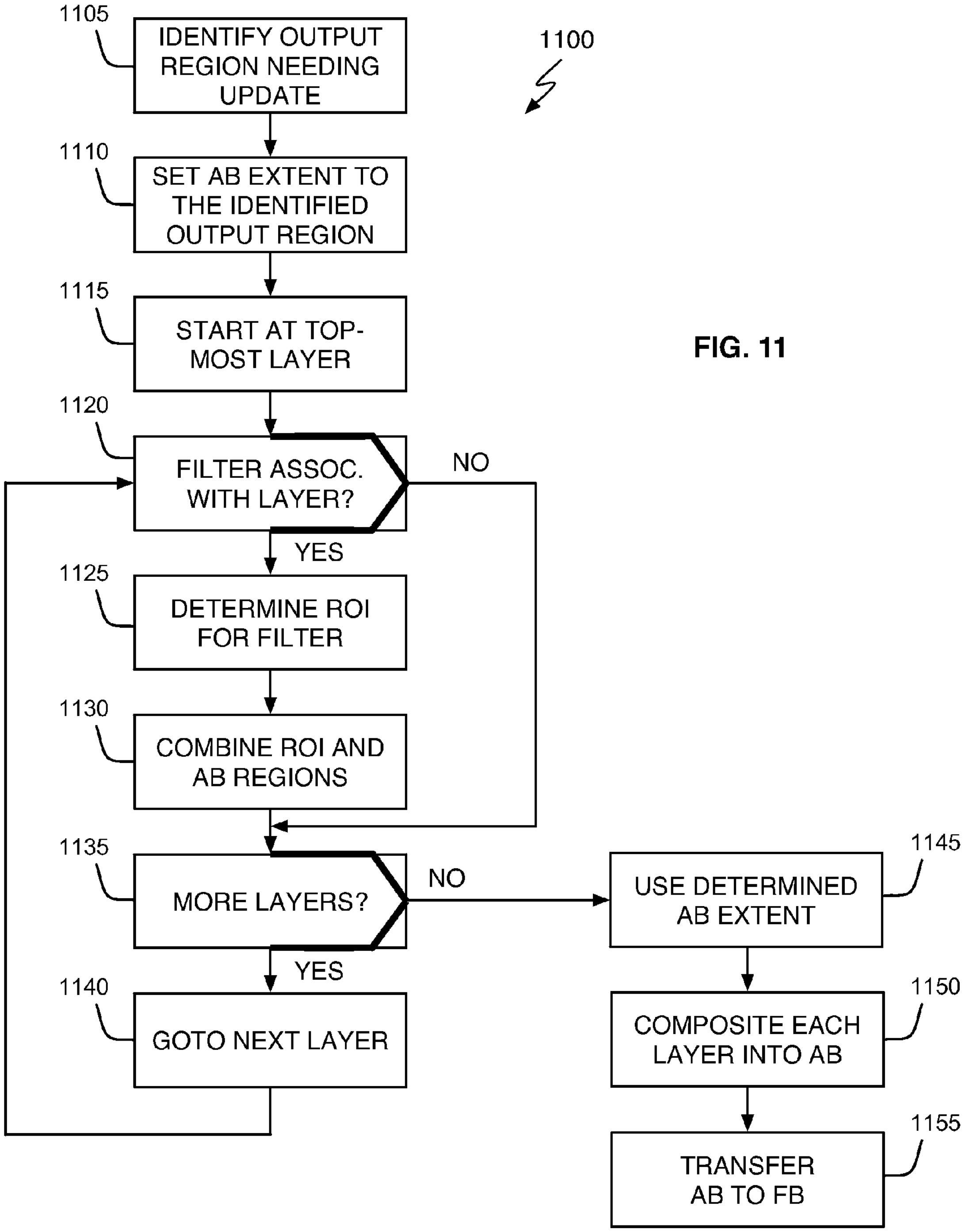
FIG. 11 shows, in flowchart format, a partial display update technique in accordance with one embodiment of the invention.

Referring to FIG. 11, assembly buffer extent (size and location) determination technique 1100 in accordance with one embodiment of the invention includes receiving identification of a region in the user's display that needs to be updated (block 1105). One of ordinary skill in the art will recognize that this information may be provided by conventional windowing subsystems. The identified region establishes the initial assembly buffer's ("AB") extent (block 1110). Starting at the top-most layer (that is, the windowing layer closest to the viewer, block 1115) a check is made to determine if the layer has an associated filter (block 1120). Illustrative output display filters include below, on and above filters as described herein. If the layer has an associated filter (the "Yes" prong of block 1120), the filter's region of interest ("ROI") is used to determine the size of the filter's input region required to generate a specified output region (block 1125). As described in the filters identified above, a filter's ROI is the input region needed to generate a specified output region. For example, if the output region identified in accordance with block 1110 comprises a region (a×b) pixels, and the filter's ROI identifies a region (x×y) pixels, then the identified (x×y) pixel region is required at the filter's input to generate the (x×y) pixel output region. The extent of the AB is then updated to be equal to the combination (via the set union operation) of the current AB extent and that of the region identified in accordance with block 1125 (block 1130). If there are additional layers to interrogate (the "Yes" prong of block 1135), the next layer is identified (block 1140) and processing continues at block 1120. If no additional layers remain to be interrogated (the "No" prong of block 1135), the size of AB needed to generate the output region identified in block 1105 is known (block 1145). With this information, an AB of the appropriate size may be instantiated and each layer overlapping the identified AB region composited into it in a linear fashion—beginning at the bottom-most or background layer and moving upward toward the top-most layer (block 1150). Once compositing is complete, that portion of the AB's contents corresponding to the originally identified output region (in accordance with the acts of block 1105) may be transferred to the appropriate location within the display's frame buffer ("FB") (block 1155). For completeness, it should be noted that if an identified layer does not have an associated filter (the "No" prong of block 1120) processing continues at block 1135. In one embodiment, acts in accordance with blocks 1110-1145 may be performed by one or more cooperatively coupled general purpose CPUs, while acts in accordance with blocks 1150 and 1155 may be performed by one or more cooperatively coupled GPUs.

Figure 12:
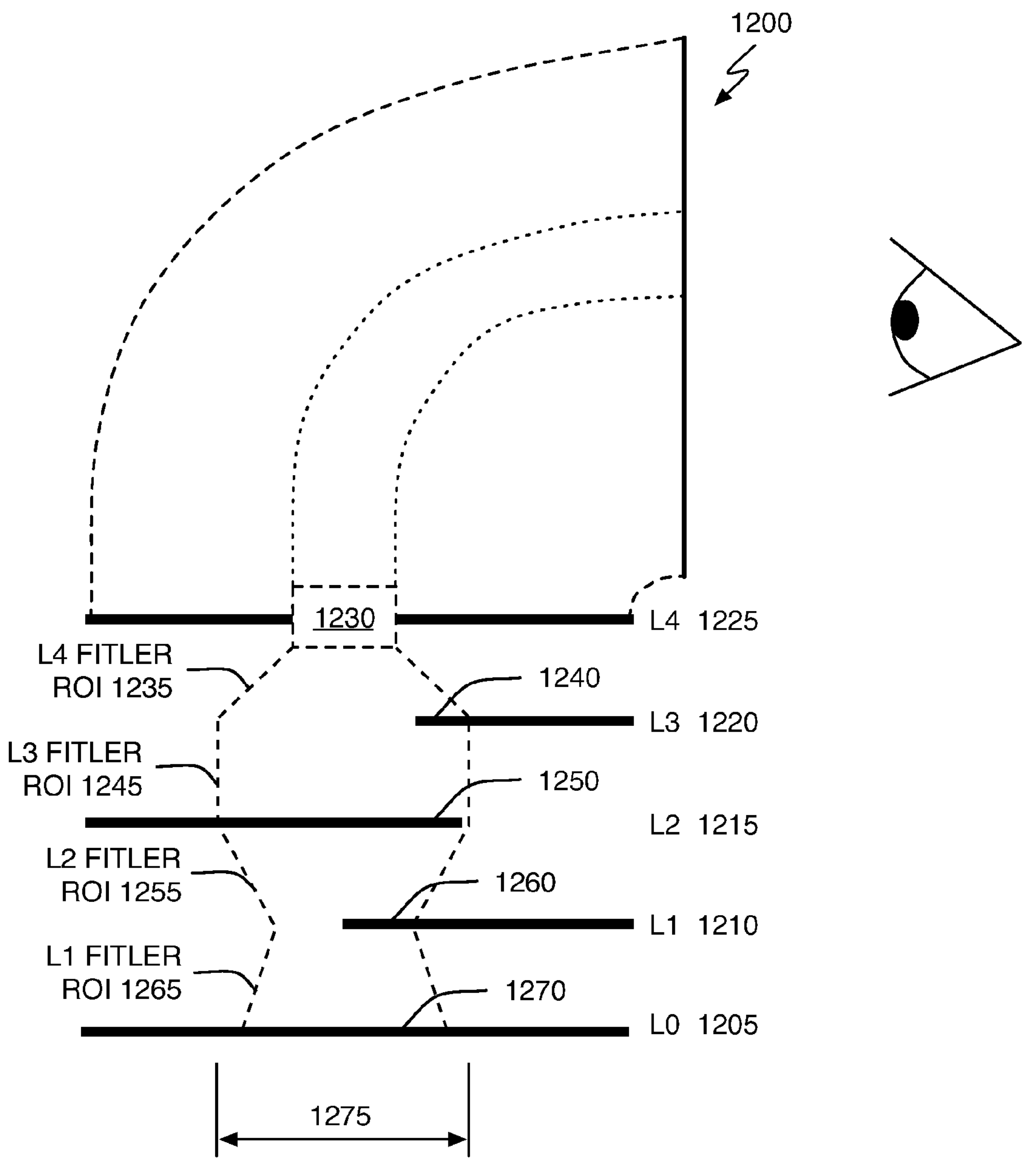
FIG. 12 shows an illustrative system in accordance with the invention in which a partial display update is performed.

To illustrate how process 1100 may be applied, consider FIG. 12 in which user's view 1200 is the result of compositing five (5) display layers: background layer L0 1205, layer L1 1210, layer L2 1215, layer L3 1220 and top-most layer L4 1225. In this example, assume region 1230 has been identified as needing to be update on display 1200 and that (i) layer L4 1225 has a filter whose ROI extent is shown as 1235, (ii) layer L3 1220 has a filter whose ROI extent is shown as 1245, (iii) layer L2 1225 has a filter whose ROI extent is shown as 1255, and (iv) layer L1 1210 has a filter whose ROI extent is shown as 1265.

In accordance with process 1100, region 1230 is used to establish an initial AB size. (As would be known to those of ordinary skill in the art, the initial location of region 1230 is also recorded.) Next, region 1240 in layer L3 1220 needed by layer L4 1225's filter is determined. As shown, the filter associated with layer L4 1225 uses region 1240 from layer L3 1220 to compute or calculate its display (L4 Filter ROI 1235). It will be recognized that only that portion of layer L3 1220 that actually exists within region 1240 is used by layer L4 1225's filter. Because the extent of region 1240 is greater than that of initial region 1230, the AB extent is adjusted to include region 1240. A similar process is used to identify region 1250 in layer L2 1215. As shown in FIG. 12, the filter associated with layer L3 1220 does not perturb the extent/size of the needed assembly buffer. This may be because the filter is the NULL filter (i.e., no applied filter) or because the filter does not require more, or fewer, pixels from layer L2 1215 (e.g., a color correction filter).

The process described above, and outlined in blocks 1120-1130, is repeated again for layer L2 1215 to identify region 1260 in layer L1 1210. Note that region 1260 is smaller than region 1250 and so the size (extent) of the AB is not modified. Finally, region 1270 is determined based on layer L1's filter ROI 1265. If region 1270 covers some portion of background layer L0 1205 not yet "within" the determined AB, the extent of the AB is adjusted to do so. Thus, final AB size and location (extent) 1275 represents the union of the regions identified for each layer L0 1205 through L4 1225. With region 1275 known, an AB of the appropriate size may be instantiated and each layer that overlaps region 1275 is composited into it—starting at background layer L0 1205 and finishing with top-most layer L4 1225 (i.e., in a linear fashion). That portion of the AB corresponding to region 1230 may then be transferred into display 1200's frame buffer (at a location corresponding to region 1230) for display.

As noted above, visual effects and display updates in accordance with the invention may incorporate substantially any known visual effects. These include color effects, distortion effects, stylized effects, composition effects, half-tone effects, transition effects, tile effects, gradient effects, sharpen effects and blur effects.

Various changes in the components as well as in the details of the illustrated operational methods are possible without departing from the scope of the following claims. For instance, in the illustrative system of FIG. 2 there may be additional assembly buffers, temporary buffers, frame buffers and/or GPUs. Similarly, in the illustrative system of FIG. 12, there may be more or fewer display layers (windows). Further, not all layers need have an associated filter. Further, regions identified in accordance with block 1125 need not overlap. That is, regions identified in accordance with the process of FIG. 11 may be disjoint or discontinuous. In such a case, the union of disjoint regions is simply the individual regions. One of ordinary skill in the art will further recognize that recordation of regions may be done in any suitable manner. For example, regions may be recorded as a list of rectangles or a list of (closed) paths. In addition, acts in accordance with FIGS. 3A, 4A, 6A, 7A and 9 may be performed by two or more cooperatively coupled GPUs and may, further, receive input from one or more system processing units (e.g., CPUs). It will further be understood that fragment programs may be organized into one or more modules and, as such, may be tangibly embodied as program code stored in any suitable storage device. Storage devices suitable for use in this manner include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

The preceding description was presented to enable any person skilled in the art to make and use the invention as claimed and is provided in the context of the particular examples discussed above, variations of which will be readily apparent to those skilled in the art. Accordingly, the claims appended hereto are not intended to be limited by the disclosed embodiments, but are to be accorded their widest scope consistent with the principles and features disclosed herein.

What is claimed is:

1. A method to generate a display-wide visual effect using one or more processing units, comprising:

copying content from an image buffer into a second buffer;

filtering by executing one or more fragment programs on a graphics processing unit capable of executing a plurality of fragment programs in parallel, the second buffer's contents back into the image buffer to generate a specified visual effect, wherein the image buffer is associated with a system frame buffer; and compositing by executing one or more fragment programs on the graphics processing unit, an application-specific window buffer into the image buffer, wherein the act of compositing is performed by the graphics processing unit after the act of filtering and wherein the application-specific window buffer comprises a backing store associated with a computer application executing in a computer's buffered window system.

2. The method of claim 1, wherein the act of filtering comprises filtering less than all of the second buffer's contents.

3. The method of claim 1, wherein the specified visual effect comprises one or more of the following visual effects: color effects, distortion effects, stylized effects, composition effects, half-tone effects, transition effects, tile effects, gradient effects, sharpen effects and blur effects.

4. The method of claim 1, further comprising transferring contents of the image buffer to the system frame buffer after the act of compositing.

5. A method to generate a display-wide visual effect, comprising:

filtering, by executing one or more fragment programs on a graphics processing unit, first content from an application-specific window buffer and second content from an image buffer into a second buffer to create third content using the graphics processing unit to generate a specified visual effect wherein the graphics processing unit is capable of executing a plurality of fragment programs in parallel and wherein the application-specific window buffer comprises a backing store associated with a computer application executing in a computer's buffered window system; and transferring, using the graphics processing unit, the third content of the second buffer into the image buffer, said image buffer associated with a system frame buffer.

6. The method of claim 5, wherein the act of filtering comprises filtering less than all of the first content from the application-specific window buffer.

7. The method of claim 5, wherein the specified visual effect comprises one or more of the following visual effects: color effects, distortion effects, stylized effects, composition effects, half-tone effects, transition effects, tile effects, gradient effects, sharpen effects and blur effects.

8. A method to generate a display-wide visual effect, comprising:

compositing, by executing one or more fragment programs on a graphics processing unit, first content from an application-specific window buffer into an image buffer to create second content, said image buffer associated with a system frame buffer wherein the application-specific window buffer comprises a backing store associated with a computer application executing in a computer's buffered window system;

copying the second content from the image buffer into a second buffer to create third content; and filtering, by executing one or more fragment programs on the graphics processing unit, the third content in the second buffer into the image buffer using the graphics processing unit to generate a specified visual effect wherein the graphics processing unit is capable of executing a plurality of fragment programs in parallel.

9. The method of claim 8, wherein the act of filtering first content comprises filtering less than all content in the application-specific window buffer.

10. The method of claim 8, wherein the specified visual effect comprises one or more of the following visual effects: color effects, distortion effects, stylized effects, composition effects, half-tone effects, transition effects, tile effects, gradient effects, sharpen effects and blur effects.

11. A non-transitory computer-readable medium having computer-executable instructions stored therein for causing one or more programmable processing units to perform the method recited in claim 1.

12. A non-transitory computer-readable medium having computer-executable instructions stored therein for causing one or more programmable processing units to perform the method recited in claim 5.

13. A non-transitory computer-readable medium having computer-executable instructions stored therein for causing one or more programmable processing units to perform the method recited in claim 8.

14. A computer system, comprising:

a central processing unit;

memory, operatively coupled to the central processing unit, said memory adapted to provide a plurality of application-specific window buffers, at least one assembly buffer, and at least one frame buffer;

a display port operatively coupled to the frame buffer and adapted to couple to a display device;

a graphics processing unit operatively coupled to the memory and capable of executing a plurality of fragment programs in parallel; and one or more programs for causing the graphics processing unit to perform the method recited in claim 1.

15. A computer system, comprising:

a central processing unit;

memory, operatively coupled to the central processing unit, said memory adapted to provide a plurality of application-specific window buffers, at least one assembly buffer, and at least one frame buffer;

a display port operatively coupled to the frame buffer and adapted to couple to a display device;

a graphics processing unit operatively coupled to the memory and capable of executing a plurality of fragment programs in parallel; and one or more programs for causing the graphics processing unit to perform the method recited in claim 5.

16. A computer system, comprising:

a central processing unit;

memory, operatively coupled to the central processing unit, said memory adapted to provide a plurality of application-specific window buffers, at least one assembly buffer, and at least one frame buffer;

a display port operatively coupled to the frame buffer and adapted to couple to a display device;

a graphics processing unit operatively coupled to the memory and capable of executing a plurality of fragment programs in parallel; and one or more programs for causing the graphics processing unit to perform the method recited in claim 8.

* * * * *